United States Patent
Camras

(10) Patent No.: US 10,344,946 B2
(45) Date of Patent: Jul. 9, 2019

(54) LENS WITH ELONGATED RADIATION PATTERN

(71) Applicant: Lumileds LLC, San Jose, CA (US)

(72) Inventor: Michael David Camras, San Jose, CA (US)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 15/579,105

(22) PCT Filed: May 20, 2016

(86) PCT No.: PCT/US2016/033457
§ 371 (c)(1),
(2) Date: Dec. 1, 2017

(87) PCT Pub. No.: WO2016/196039
PCT Pub. Date: Dec. 8, 2016

(65) Prior Publication Data
US 2018/0172238 A1      Jun. 21, 2018

Related U.S. Application Data

(60) Provisional application No. 62/169,053, filed on Jun. 1, 2015.

(51) Int. Cl.
| | |
|---|---|
| F21V 5/02 | (2006.01) |
| F21V 5/04 | (2006.01) |
| G02B 3/02 | (2006.01) |
| G02B 19/00 | (2006.01) |
| F21S 41/25 | (2018.01) |
| F21S 41/26 | (2018.01) |

(Continued)

(52) U.S. Cl.
CPC .............. *F21V 5/04* (2013.01); *F21S 41/25* (2018.01); *F21S 41/26* (2018.01); *G02B 3/02* (2013.01); *G02B 19/0061* (2013.01); *F21Y 2101/00* (2013.01); *F21Y 2115/10* (2016.08); *G02B 2003/0093* (2013.01)

(58) Field of Classification Search
CPC ......... F21V 5/04; F21S 41/26; F21Y 2115/10; G02B 19/0061; G02B 3/02
See application file for complete search history.

(56) References Cited

U.S. PATENT DOCUMENTS

| | | | |
|---|---|---|---|
| 7,339,200 B2 | 3/2008 | Amano et al. | |
| 7,857,497 B2 * | 12/2010 | Koike | F21S 8/088 362/545 |

(Continued)

FOREIGN PATENT DOCUMENTS

| | | |
|---|---|---|
| KR | 20130133993 | 12/2013 |
| WO | 2012/041638 | 4/2012 |

*Primary Examiner* — Ali Alavi
(74) *Attorney, Agent, or Firm* — Volpe and Koenig, P.C.

(57) ABSTRACT

An elongated lens (300) is formed with a trough (310) along the long axis on the light emitting surface of the lens. The elongated lens (300) may include a curved wall (325) about its perimeter, and a smooth transition (317) between the curved wall (325) and the trough (310). The trough (310) may include a concave shape along both the long axis and the short axis, although the radius of curvature of the concave shape may differ between the long and short axes. The eccentricity of the illumination pattern may be controlled by the size of the trough (310) and these radii of curvature.

16 Claims, 5 Drawing Sheets

(51) Int. Cl.
  *F21Y 101/00* (2016.01)
  *G02B 3/00* (2006.01)
  *F21Y 115/10* (2016.01)

(56) References Cited

U.S. PATENT DOCUMENTS

| | | | |
|---|---|---|---|
| 8,651,707 B1* | 2/2014 | Tang | F21V 5/04 |
| | | | 362/311.02 |
| 2005/0243577 A1 | 11/2005 | Moon | |
| 2006/0034097 A1 | 2/2006 | Hahm et al. | |
| 2007/0029563 A1* | 2/2007 | Amano | G02B 3/02 |
| | | | 257/98 |
| 2007/0109952 A1 | 5/2007 | Jeong et al. | |
| 2011/0062469 A1 | 3/2011 | Camras et al. | |
| 2011/0075428 A1* | 3/2011 | Chen | F21V 5/04 |
| | | | 362/311.02 |
| 2011/0235338 A1* | 9/2011 | Chen | F21V 5/04 |
| | | | 362/311.02 |
| 2012/0120118 A1* | 5/2012 | Chan | G02B 6/0023 |
| | | | 345/690 |
| 2012/0218739 A1 | 8/2012 | Muschaweck | |
| 2012/0299030 A1 | 11/2012 | Brick | |
| 2013/0077304 A1* | 3/2013 | Gordin | F21K 9/90 |
| | | | 362/235 |
| 2013/0100641 A1* | 4/2013 | Zhang | F21V 13/14 |
| | | | 362/84 |
| 2015/0276170 A1* | 10/2015 | Motoyanagi | F21V 5/04 |
| | | | 362/335 |

\* cited by examiner

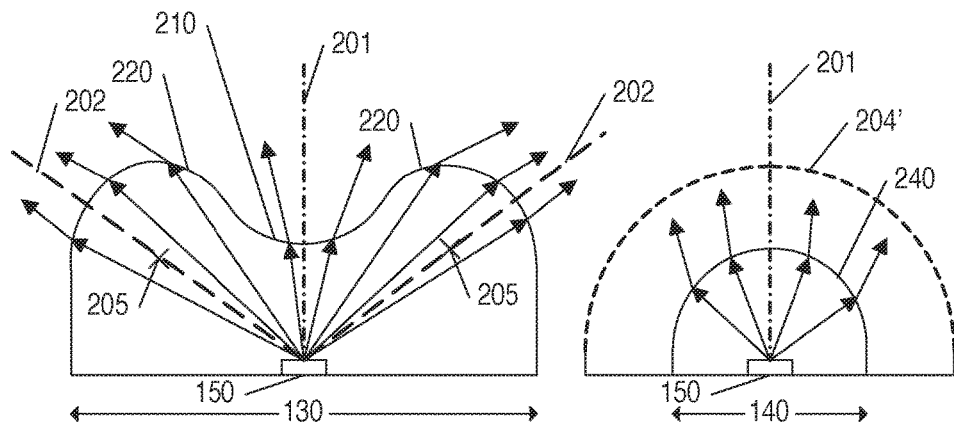
FIG. 2A
FIG. 2B
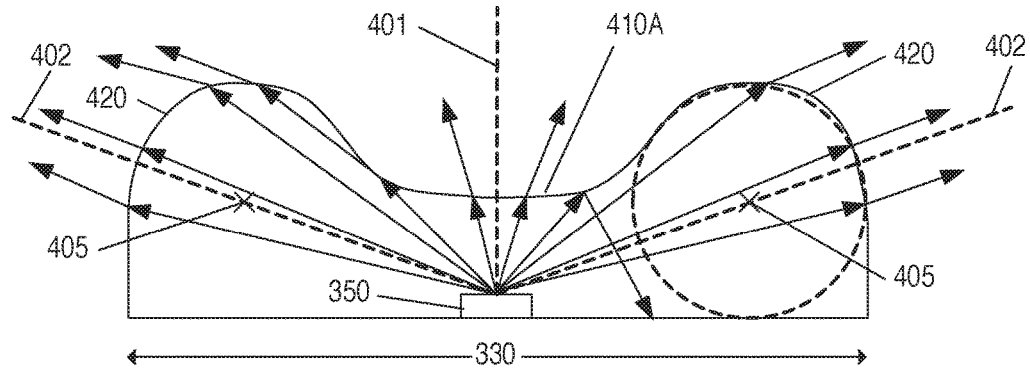
FIG. 4A
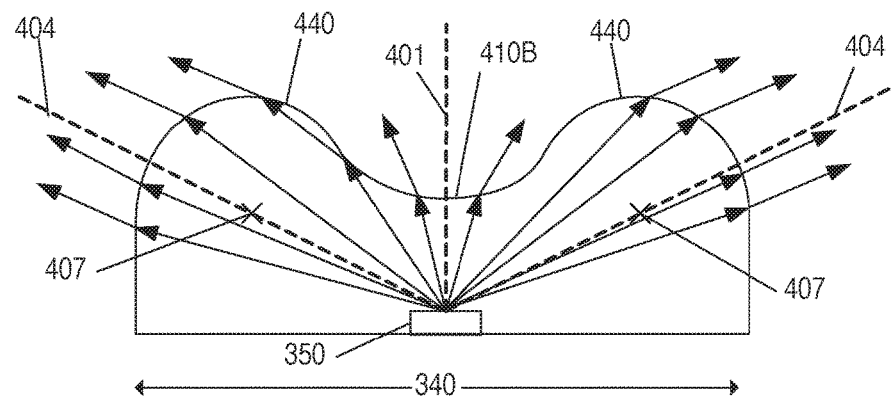
FIG. 4B

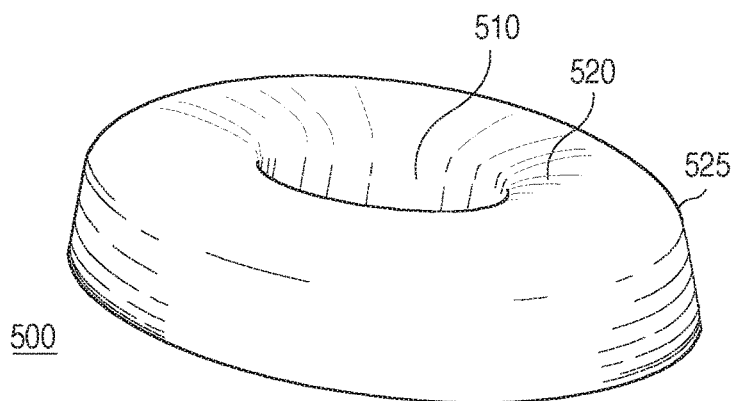
FIG. 5A
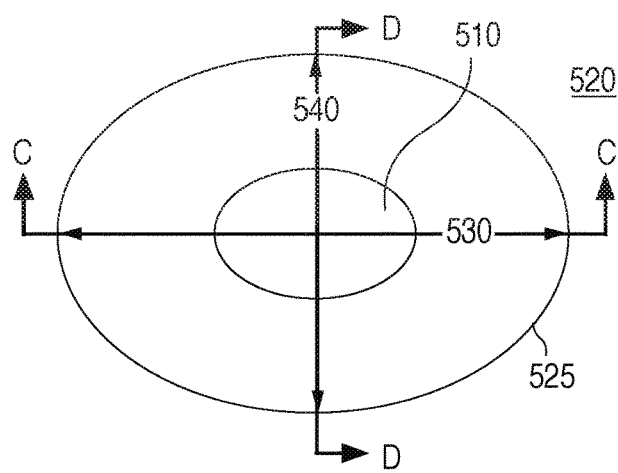
FIG. 5B
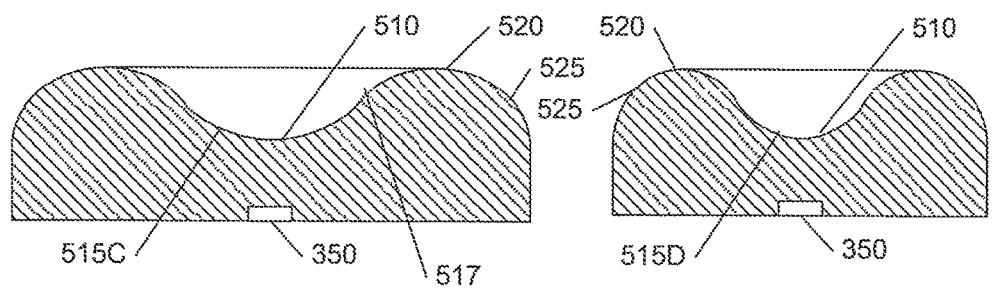
FIG. 5C          FIG. 5D

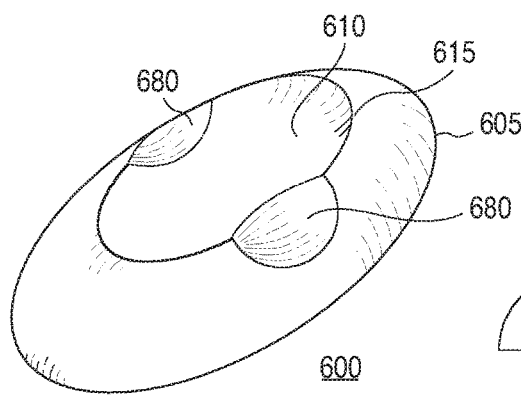
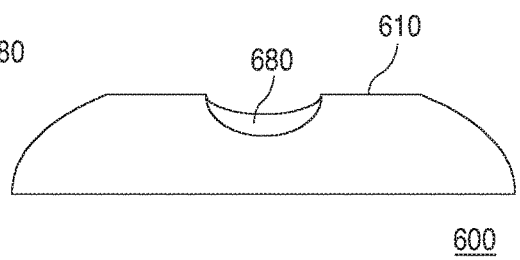
FIG. 6A FIG. 6B
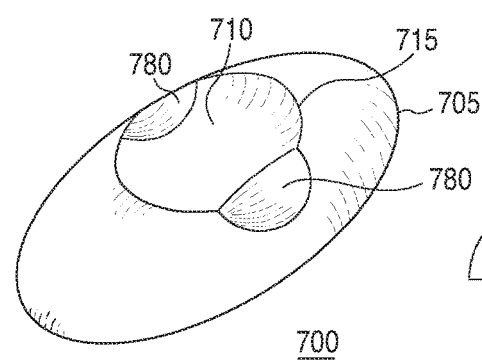
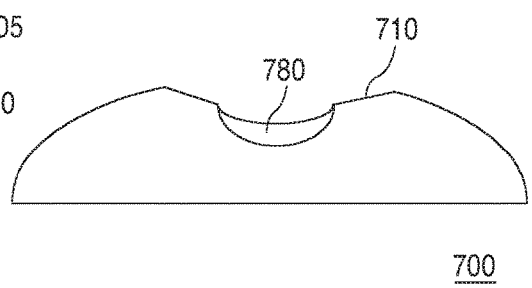
FIG. 7A FIG. 7B
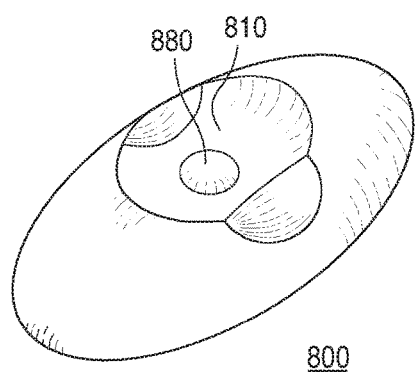
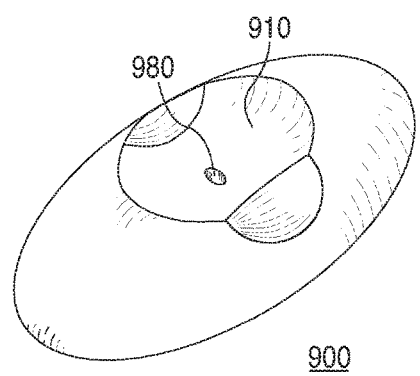
FIG. 8 FIG. 9

LENS WITH ELONGATED RADIATION PATTERN

CROSS-REFERENCE TO RELATED APPLICATIONS

This application is the U.S. National Stage, under 35 U.S.C. § 371, of International Application No. PCT/US2016/033457, filed May 20, 2016, which claims the benefit of U.S. Provisional Application No. 62/169,053, filed Jun. 1, 2015, the contents of which are hereby incorporated by reference herein.

FIELD OF THE INVENTION

This invention relates to the field of light emitting devices, and in particular to a lens structure that facilitates the generation of an elongated radiation pattern.

BACKGROUND OF THE INVENTION

Lenses are commonly used to alter the shape of the illumination/radiation pattern produced by a light source. Elongated illumination patterns are often required for camera flash lamps, vehicle head lamps, street lighting, and so on.

U.S. Pat. No. 7,339,200, "LIGHT-EMITTING DIODE AND VEHICULAR LAMP", issued 4 Mar. 2008 to Amano et al. discloses a lens that provides an elongated illumination pattern for a vehicular lamp by increasing the divergence of light from a light emitting device along one axis. To compensate for the greater intensity of light when viewed from the center of the light emitting source, compared to the off-center intensity, the lens includes a concave portion about an optical center of the light emitting device, and a convex portion on either side of the optical center, the convex portions having a larger emission surface than the concave portion. The resultant lens is "peanut shaped", the concave portion corresponding to the narrowed center portion of a peanut shell.

FIGS. 1A-1D illustrate an example peanut shaped lens 100 that provides an elongated illumination pattern from a single light source that emits a Lambertian radiation pattern. FIG. 1A is a perspective view that illustrates the peanut shape having a narrowed center region 110 separating two larger lobes 120. The illustrations are not to scale, and may include exaggerated features for ease of illustration and explanation. In some embodiments, the difference in size/volume between the larger lobes 120 and the smaller center region 110 may be substantially less than illustrated in these figures.

FIG. 1B illustrates a top view of the peanut shaped lens of FIG. 1A, while FIGS. 1C and 1D illustrate cross-section views taken along views C-C and D-D, respectively, of FIG. 1B. The view C-C is taken along the long axis 130, and the view D-D is taken along the short axis 140. As illustrated in FIG. 1C, the larger lobes 120 form a convex surface, and the center region 110 forms a concave structure, as viewed along cross-section C-C. As illustrated in FIG. 1D, the cross-section of the center region 110 forms a convex surface. This convex cross-section extends for the entire length of the lens through the long axis 130 of the lens, include the larger lobes 120, the radius of the convex surface changing accordingly. Light source 150 may be a semiconductor light emitting device (LED), or a plurality of light emitting devices, and may be arranged within a recess of the lens or situated on or near the lower surface of the lens.

FIGS. 2A and 2B illustrate the light propagation through the lens 100 with respect to each axis 130, 140, respectively. As disclosed, the lens 100 includes a concave lens portion 210 and two convex lens portions 220 on either side of the concave lens 210. Each of these lens portions provide an optical axis with respect to the light source 150. The concave lens portion 210 provides optical axis 201, and each of the convex lens portions 220 provides an optical axis 202. Each optical axis 202 extends from the light source 150 through the center of curvature 205 of the convex lens portions 220. The concave lens 210 serves to disperse the light emitted from the light source 150 away from the optical axis 201, forming an elongated light emission pattern along the long axis 130. Each of the convex lenses 220 serve to converge the light toward its respective optical axis 202, which results in an elongated light emission pattern along the long axis 130. By proper selection of the size and curvatures of the lenses 210, 220, a uniformly illuminated elongated light emission pattern may be formed.

The cross section of the lens 100 relative to the short axis 140 forms a convex lens 240. The cross section taken along any point on the long axis 130 forms a similarly shaped convex lens, as indicated by the dashed line 240', the size being relative to the height and width of the lens 100 along the long axis 130. As illustrated, the convex lens 240 serves to concentrate/collimate the light from the light source 150, forming a relatively narrow light emission pattern along the short axis 140. The convex lens 240' will similarly concentrate/collimate the light from the light source 150, maintaining a narrower light emission pattern along the short axis 140.

The overall emission pattern formed by the lens 100 is long in one axis, and narrow in the other axis, forming a substantially rectangular, or oval illumination pattern. However, the complex shape of the lens 100 introduces interdependencies between the parameters in each dimension. For example, if a wider illumination pattern is desired relative to the short axis (FIG. 2B), the radius of curvature of the convex lens 240 may need to be decreased. This change of shape of the lens 240 may limit the feasible shapes of the lenses 220. Constraints on the physical size of the lens as well as methods of forming a suitable mold may also limit the shape of the lens.

SUMMARY OF THE INVENTION

It would be advantageous to provide a lens that provides an elongated illumination pattern that allows for greater independence with regard to the shape of the illumination pattern in each axis. It would be advantageous, for example, to provide a lens that provides a substantially rectangular or oval illumination pattern with greater independence of control of each dimension of the rectangle/oval.

To better address one or more of these concerns, in an embodiment of this invention, an elongated lens is formed with an elongated trough along the long axis on the light emitting surface of the lens. The elongated lens may include a curved wall about its perimeter, and a smooth transition between the curved wall and the trough. The trough may include a concave shape along both the long axis and the short axis, although the radius of curvature of the concave shape may differ between the long and short axes. The eccentricity of the illumination pattern may be controlled by the size of the trough and these radii of curvature.

A light emitting device may be formed by providing a light emitting element and an elongated lens having a short axis, a long axis, and an upper surface through which desired light from the light emitting element is emitted; wherein the upper surface of the lens includes a trough that extends along the long axis, and a perimeter of the lens includes a curved wall.

The trough may be symmetric about the short axis and/or the long axis with respect to an optical axis of the light emitting element. There may be a smooth transition joining the trough to the curved wall, and at least a portion of the curved wall may be reflective.

The lower surface of the trough may have a curvature along the short axis that differs from a curvature along the long axis, and may have a perimeter that is substantially oval. In like manner, the perimeter of the lens may be substantially oval. The oval perimeter may also be truncated in the long or short dimension.

BRIEF DESCRIPTION OF THE DRAWINGS

The invention is explained in further detail, and by way of example, with reference to the accompanying drawings wherein:

FIGS. 2A-2B illustrate the cross-section of the light emitting device of FIGS. 1A-1D, with representative light rays.

FIGS. 4A-4B illustrate the cross sections of the light emitting device of FIGS. 3A-3D, with representative light rays.

FIGS. 5A-5D illustrate another example light emitting device that includes an elongated lens in accordance with aspects of this invention.

FIGS. 6A, 6B, 7A, 7B, 8, and 9 illustrate other example elongated lenses in accordance with aspects of this invention.

Throughout the drawings, the same reference numerals indicate similar or corresponding features or functions. The drawings are included for illustrative purposes and are not intended to limit the scope of the invention.

DETAILED DESCRIPTION

Figure 1A:
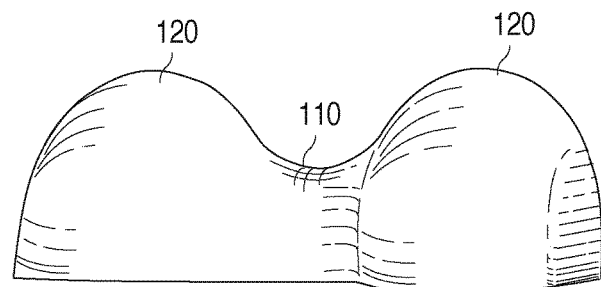
FIGS. 1A-1D illustrate an example prior art light emitting device that includes an elongated lens that provides a substantially rectangular or oval illumination pattern.
Figure 1B:
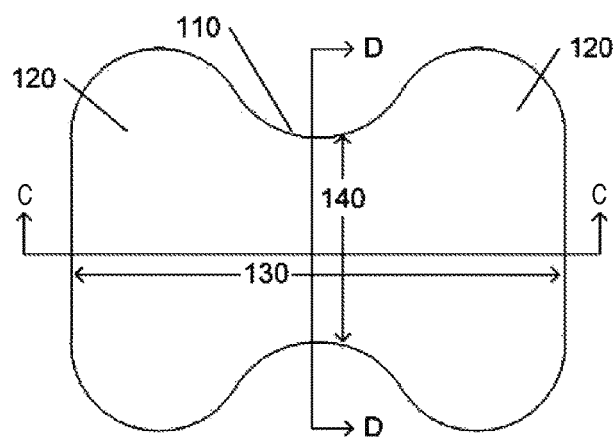
Figure 1C:
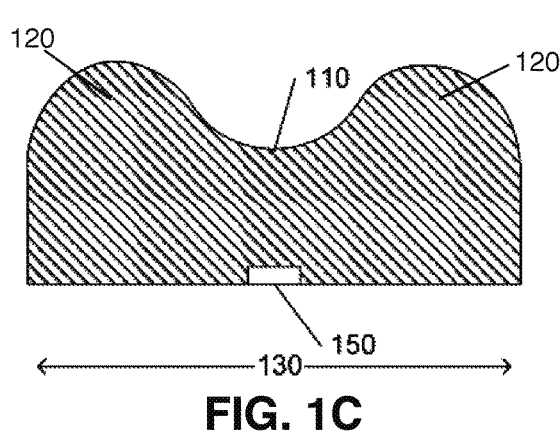
Figure 1D:
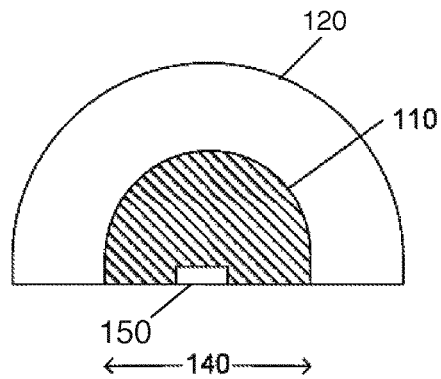

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

For ease of explanation and understanding, directions and/or orientations are specified with reference to a "top-emitting" light emitting device, wherein, for example, light is assumed to propagate 'up' from a light source then exit from an "upper surface" of the lens, opposite the location of the light source. Typically the light source will be a parallelepiped where two of the surfaces will be larger than the other four. One of the larger surfaces is designated as the "top" of the light emitting device. The four smaller surfaces are the "side surfaces" of the light emitting device which typically emit little or no light. Most of the light is emitted from the "top" of the light emitting device. The "upper surface" of the lens is opposite the "top" of the light emitting device.

Some light may exit the 'side surfaces' of the lens i.e. the portions of the lens opposite the "side surfaces" of the light emitting device. The lens of this invention is designed such that a substantial majority of the light from the light source exits the upper surface, in contrast to lenses that are designed to create side-emitting devices that emit a substantial majority of the light through surfaces that are not directly opposite the light source.

FIGS. 3A-3D illustrate an example light emitting device that includes a light source 350, and an elongated lens in accordance with aspects of this invention. The light source 350 may include a single light emitting element, such as a light emitting diode, or multiple light emitting elements.

In any of the described embodiment the lens may be made of epoxy, silicone, sol-gel, glass or compounds, mixtures, or hybrids thereof. The index of refraction at the wavelength of the light source may range from 1.4 to 2.2. High index nano-particles with particle sizes less than 100 nm and preferably less than 50 nm dispersed in silicone or a silicate binder may be used to enhance or tune the index of refraction of the lens. Details of the materials can be found in US publication number 20110062469, which is commonly assigned and incorporated by reference in its entirety.

In one embodiment the light source may be a light emitting diode (LED) with a dimension ranging from 0.2 to 6 mm. The lens may have an outside dimension ranging from 1.5 to 50 times the dimension of the LED. The aspect ratio of the long to short dimension of the lens can range from 1.25 to 50.

Figure 3A:
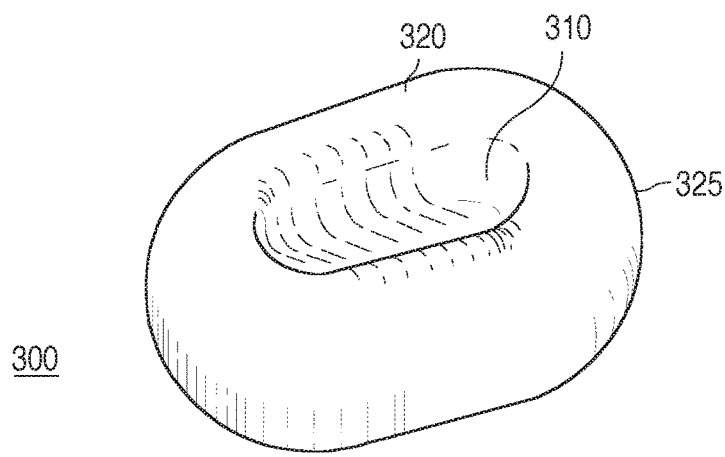
FIGS. 3A-3D illustrate an example light emitting device that includes an elongated lens in accordance with aspects of this invention.
Figure 3B:
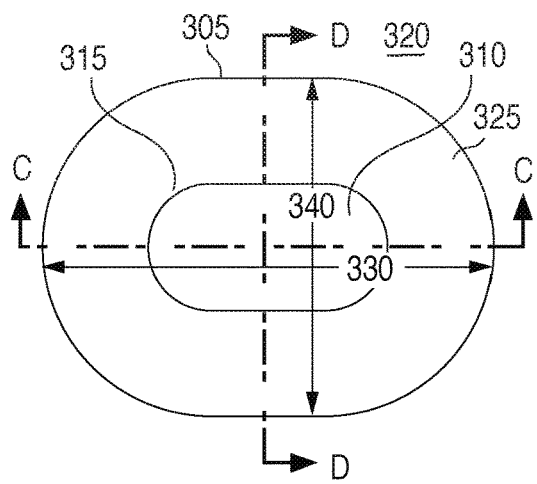
Figure 3C:
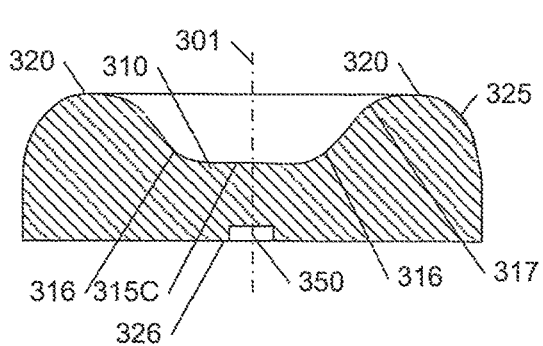
Figure 3D:
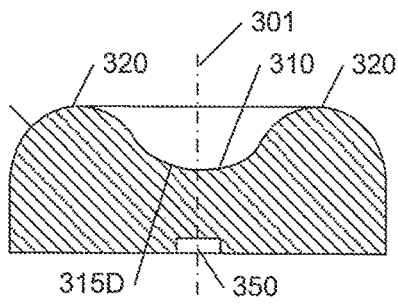

FIG. 3A illustrates a perspective view of the elongated lens 300. FIG. 3B illustrates a top view of the elongated lens 300, through which light is emitted. FIG. 3C illustrates a cross section view C-C taken along the long axis 330. FIG. 3D illustrates a cross section view D-D taken along the short axis 340. The perimeter 305 of the lens 300 is an oval shape with long and short dimensions. The perimeter 305 has curved ends along the short dimension and straight lines along the long dimension. In the alternative, the straight lines may have a convex curvature so as to form, for example, an elliptical perimeter.

As illustrated, the lens 300 includes a trough 310 formed in the upper surface 320. For the purposes of this disclosure, a trough is defined as a depression in the upper surface 320, along an axis of the lens 300 that is shorter than the length of the lens along that axis. The trough 310 may have an oval shape with a long dimension and a short dimension. The ratio of the dimension of the trough may be the same or different than the ratio of the long and short dimensions of the lens 300, and the perimeter 315 of the trough 310 may be similar in shape to the perimeter 305 of the lens 300. As detailed further below, to provide a continuous dispersion of the light emitted from the light source 350, the perimeter 305 of the lens 300 may include a curved wall 325, and there may be a smooth transition 317 between the curved wall 325 and the trough 310. Similarly, the trough 310 may include curved surfaces 316. For ease of explanation and understanding the term "upper surface 320" is used herein to refer to the surface of trough 310, the surface of curved portions 316 and 317, and the surface of the curved portion of the curved wall 325, collectively the surface of the lens 300 emitting the desired light.

The lens 300 includes a base 326, which may include a recess for receiving the light source 350; alternatively, the light source 350 may be flush with the base or slightly below the base 326. Light source 350 may include a reflector, a reflector cup, or a reflector ring.

One of skill in the art will recognize that discontinuous surfaces may be used, but in general, a smooth continuous surface is preferred to provide an illumination pattern that does not include abrupt transitions in illumination intensity. However, if abrupt transitions are desirable, discontinuous surfaces may provide the desired illumination pattern. The lens 300 may be formed via a mold that provides the shapes of the lens 300, including the trough 310. Other techniques for forming the lens 300 are feasible, including milling the trough 310 out of a preformed elongated lens.

As illustrated in FIGS. 3C and 3D, the trough 310 introduces a lower elevation of the lens 300 at or near the optical axis 301, and a higher elevation on the upper surface 320 of the lens 300.

In the example cross-section C-C of FIG. 3C, a lower surface 315 of the trough 310 may be nearly flat near the optical axis 301, then curves upward 316 toward the higher elevation of the upper surface 320. This substantially flat region 315C may introduce more loss of the light emitted by the light source 350 than a more sharply shaped convex region. Light striking the flatter region 315C of the depression 310 at greater than a critical angle will be totally internally reflected (TIR) away from the region 315C, thereby increasing the likelihood of the light being absorbed in the device.

In the example cross-section D-D of FIG. 3D, the lower surface 315 of the trough 310 along the short axis 340 provides a concave shape 315D, which also disperses light from the light source 350, but not as far spatially because the convex lobes 320 are more closely spaced along the short axis 340 than for the long axis 330.

The degree of dispersion of the light in the center region of the lens 300 is determined by the shape (length, width, depth, shape) of the trough 310, including the radius of curvature of the lower surface 315 along each axis 330, 340. The surface 315 along the cross-section C-C includes three radii of curvature, a radius of curvature for each of the curved portions 316, and a radius of curvature for the center portion 315C, which may be very large. The surface 315 along the cross section D-D includes the radius of curvature of concave portion 315D. In this example, the degree of dispersion will be greater along the long axis 330, and the total internal reflection at the surfaces 316 may augment the illumination intensity at angles farther from the optical axis 301.

FIGS. 4A-4B illustrate the propagation of light through the lens 300 relative to the long axis 330 and short axis 340, respectively.

As illustrated in FIG. 4A, the cross section shape along the long axis 330 comprises a concave lens 410A and two convex lens portions 420. The concave lens portion 410A will disperse the light away from the optical axis 401, albeit to a lesser extent than it would if the convex lens portions 420 were more widely spaced apart. The two convex lens portions 420 converge the light toward their corresponding optical axes 402.

The overall effect of the lens portions 410A, 420 is an elongation of the illumination pattern along the long axis 330. The extent of the elongation may be controlled by the orientation of the optical axes 402, the centers of curvature 405, as well as the radii of curvature for each of the lens portions 410A, 420, and other parameters related to the shape of the profile along the long axis 330.

As illustrated in FIG. 4B, the cross section shape along the short axis 340 comprises a concave lens portion 410B and two convex lens portions 440. Of particular note, although both the concave lens portion 410A (FIG. 4A) and the concave lens portion 410B are formed by the trough 310 (FIG. 3), the shape of each lens portion 410A, 410B are substantially independent of each other. In this example, lens portion 410A is flatter than lens portion 410B, which is continually curved.

In like manner, the two convex lens portions 440 of FIG. 4B may differ substantially from the convex lens portions 420 of FIG. 4A. Although in this example, the lens portions 440 and 420 are somewhat similar, one of skill in the art will recognize that the surface 320 (FIG. 3) that forms these lens portions 420, 440 need not be uniformly thick around the lens 300, nor uniformly tall. One of skill in the art will recognize that illumination analysis programs may be used to determine the appropriate shape for transitioning between such differing shapes.

As in FIG. 4A, the extent and uniformity of the illumination pattern relative to the short axis 340 may be controlled by the orientation of the optical axes 404 of the convex lens portions 440, the centers of curvature 407 of these lenses 440, as well as the radii of curvature for each of the lenses 410B, 440, and other parameters related to the shape of the profile along the short axis 340.

One of skill in the art will recognize that the particular shape of the trough, as well as the overall shape of the lens, will be based on the desired light illumination pattern, as well as the intensity distribution. In some embodiments, for example, it may be desirable to provide uniform intensity near the center of the illumination pattern, tapering off, gradually or more sharply, at a given off-axis angle in each dimension. Conventional light propagation and illumination analysis tools may be used to determine a combination of shapes in each dimension that produces the desired illumination pattern and intensity distribution.

FIGS. 5A-5D illustrate another example light emitting device that includes an elongated lens in accordance with aspects of this invention. As contrast to the lens 300, which includes a substantially oval perimeter and substantially oval trough 310, the lens 500 of FIGS. 5A-5D includes a substantially elliptical profile and substantially elliptical trough 510.

For the purposes of this disclosure, the term oval is used to describe an elongated shape having a curved perimeter, including elliptical or other shapes. For ease of explanation and understanding the term "upper surface 520" is used herein to refer to the surface of trough 510, the surface of curved portion 517, and the surface of the curved portion of the curved wall 525, collectively the surface of the lens radiating the desired light.

As illustrated, the curved wall 525, having no linear portions, forms a substantially elliptical perimeter of the lens 500, and the trough 510 also has substantially elliptical perimeter. In this example, the lower surface 515 provides a substantially continuous concave profile 515C in the long axis 530, and a substantially continuous concave profile 515D in the short axis 540. The profile 515C along the long axis 530 may correspondingly provide a more disperse emission pattern from the center of the lens 500 with less loss than the flatter profile 315C of lens 300. One of skill in the art will recognize, however, that portions of the lower surface 515, in either axis, may be less curved, to increase the intensity of light at the center of the lens 500.

As noted above, conventional light propagation analysis tools may be used to determine the shape of the lens, the shape of the trough, the radii of curvature within the trough, as well as the radius of curvature of the curved wall 525, and the radii of curvature forming the smooth transition between the curved wall 525 and the trough 510.

FIGS. 6-9 illustrate other example elongated lenses with troughs in accordance with aspects of this invention. Each of these example lenses include features that augment the light emission pattern produced by the lenses conforming to those (300, 500) of FIGS. 3A-3D and FIGS. 5A-5D, as well as other shapes conforming to the principles of this disclosure. These features may serve to provide a more uniform light distribution, for example, by further dispersing light emitted from areas that might otherwise form "bright regions", or "dark regions" on a lens without these features. One of skill in the art will recognize that fewer or more features, in different sizes and shapes than illustrated may be used to achieve a desired illumination pattern.

The dimensions of each feature, including its radius of curvature, its position and orientation on the main body of the lens, and the characteristics of the main body of the lens itself will determine how these features may affect the illumination pattern provided by the lens with these features. In each embodiment, conventional computer-aided-design tools, and/or light propagation analysis tools may be used to determine the effect that the shape and dimensions of each augmentation/feature will have on the resultant light emission pattern produced by the lenses.

In FIGS. 6A-6B, the features 680 are added to a lens 600 that includes a trough 610 that has a perimeter 615 that is similar in shape to the perimeter 605 of the lens 600; and in FIGS. 7A-7B, the features 780 are added to a lens 700 that has a trough 710 that has a perimeter 715 that is different in shape from the perimeter 705 of the lens 700.

In these examples, the lens 700 includes a trough 710 that is shorter and deeper that the trough 610 of lens 600, such that it affects the profile of the lens, as illustrated in FIG. 7B, serving to illustrate that the particular arrangement of the trough with respect to the main body of the lens may vary, depending upon the desired illumination pattern. Features 680 and 780 may be convex dimples, each having a surface that is a portion of the surface of sphere or the surface of an ellipse.

In FIG. 8, a convex feature 880 is added at the center of the trough 810 of lens 800, and in FIG. 9, a concave feature (dimple) 980 is added at the center of the trough 910 of lens 900. One of skill in the art will recognize that the features 880 or 980 may be a flat surface as well. Features 880 and 980 may each have a surface that is a portion of the surface of sphere or the surface of an ellipse.

In each of the FIGS. 6-9, the features are illustrated as having sharp edges where they intersect the main body of the lens; one of skill in the art will recognize, however, that a smooth transition from the main body to each feature may provide for a more uniform illumination pattern.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein the lower surface of the lens as well as the upright portions of the curved wall are reflective, thereby reducing absorption losses and/or light propagation in unwanted directions. The transition between the convex and concave regions of the lens (e.g. 316 of lens 300 in FIG. 3C) may also be reflective, to augment the total internal reflection (TIR) in these regions. The concave region may also be entirely or partially coated with reflective material to increase total internal reflection.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A light emitting device comprising:
a light emitting element; and
an elongated lens having a short axis, a long axis, and an upper surface through which a substantial majority of the light from the light emitting device is emitted;
the upper surface of the lens being smooth and continuous and including a trough that extends along the long axis, and
the perimeter of the lens being one of substantially oval or substantially elliptical.

2. The device of claim 1, wherein the trough is symmetric about at least one of the short and the long axis with respect to an optical axis of the light emitting element.

3. The device of claim 1, wherein the upper surface includes a surface of a curved wall of the light emitting device.

4. The device of claim 3, wherein a smooth transition joins the trough to the curved wall.

5. The device of claim 3, wherein at least a portion of the curved wall is reflective.

6. The device of claim 1, wherein a lower surface of the trough has a curvature along the short axis that differs from a curvature along the long axis.

7. The device of claim 1, wherein a perimeter of the trough is substantially oval.

8. A vehicle lamp comprising:
a light emitting device; and
a lens comprising:
an elongated shape, the lens having a short axis and a long axis;
an upper surface through which a substantial majority of light exits the lens when a light emitting element is situated at or below a base of the lens;
the upper surface being smooth and continuous and including a trough that extends along at least one of the short and the long axis, and
the perimeter of the lens being one of substantially oval or substantially elliptical.

9. A light emitting device comprising:
a light emitting element; and
an elongated lens having a short axis, a long axis, and an upper surface through which a substantial majority of the light from the light emitting device is emitted;
the upper surface of the lens being smooth and continuous and including a trough that is substantially concave along both the long axis and the short axis.

10. The device of claim 9, wherein the trough is symmetric about at least one of the short and the long axis with respect to an optical axis of the light emitting element.

11. The device of claim 9, wherein the upper surface includes a surface of a curved wall of the light emitting device.

12. The device of claim 9, wherein a smooth transition joins the trough to the curved wall.

13. The device of claim 9, wherein at least a portion of the curved wall is reflective.

14. The device of claim 9, wherein a lower surface of the trough has a curvature along the short axis that differs from a curvature along the long axis.

15. The device of claim 9, wherein a perimeter of the lens is substantially oval.

16. A light emitting device comprising:
   a light emitting element; and
   an elongated lens having a short axis, a long axis, and an upper surface through which a substantial majority of the light from the light emitting device is emitted;
   the upper surface of the lens including a trough that extends along the long axis, a lower surface of the trough being substantially flat near the center of the trough.

\* \* \* \* \*